US012316485B2

(12) United States Patent
Wimbrow

(10) Patent No.: US 12,316,485 B2
(45) Date of Patent: May 27, 2025

(54) SYSTEM, METHOD, APPARATUS, AND COMPUTER PROGRAM PRODUCT FOR PROVIDING ADAPTIVE WIRELESS NOISE CANCELLATION

(71) Applicant: Steven Earl Wimbrow, Los Lunas, NM (US)

(72) Inventor: Steven Earl Wimbrow, Los Lunas, NM (US)

( * ) Notice: Subject to any disclaimer, the term of this patent is extended or adjusted under 35 U.S.C. 154(b) by 104 days.

(21) Appl. No.: 18/320,110

(22) Filed: May 18, 2023

(65) Prior Publication Data

US 2023/0379205 A1    Nov. 23, 2023

Related U.S. Application Data

(60) Provisional application No. 63/364,921, filed on May 18, 2022.

(51) Int. Cl.
*H04L 27/26* (2006.01)
*H04L 27/36* (2006.01)

(52) U.S. Cl.
CPC ........ *H04L 27/2691* (2013.01); *H04L 27/364* (2013.01)

(58) Field of Classification Search
CPC .. H04L 27/2691; H04L 27/364; H04W 16/14; H04B 1/1027; H04J 11/0036; H04J 11/004

(Continued)

(56) References Cited

U.S. PATENT DOCUMENTS 5,574,978 A * 11/1996 Talwar .................. H04B 1/525
455/296
8,085,834 B2 * 12/2011 Hanke .................. H04W 88/06
375/220

(Continued)

FOREIGN PATENT DOCUMENTS

FR        2894992 A1    6/2007

OTHER PUBLICATIONS

International Search Report and Written Opinion; PCT/US23/6719; mailed Sep. 12, 2023.

*Primary Examiner* — Emmanuel Bayard
(74) *Attorney, Agent, or Firm* — Squire Patent Consulting & IP Law LLC; Brendan E. Squire

(57) ABSTRACT

A system, method, apparatus, and computer program product for providing adaptive wireless radio frequency (RF) noise cancellation is disclosed. The invention provides countermeasures to adaptively null in-band interfering emissions to mitigate 4G LTE & 5G interference in RF Bands-of-Interest where signal-under-signal anomalies have degraded the normal operations of legacy RF systems. Embodiments of the invention include an adaptive interference canceler leveraging NVIDIA Graphics Processing Units (GPU) to perform parallel calculations across a CUDA Core architecture. This approach provides a testbed to tailor algorithms and optimize performance prior to implementation of a Field Programmable Gated Array (FPGA) embodiments. Embodiments allow adaptation to real-time changes within the channel impulse response of the RF environment. This involves real-time, digital sampling of the interfering signal from the legacy wireless system against the real-time sampling of the interfering signal from an external collection antenna.

19 Claims, 14 Drawing Sheets

(58) Field of Classification Search
USPC .......................................... 375/285, 346–349
See application file for complete search history.

(56) References Cited

U.S. PATENT DOCUMENTS

| | | | |
|---|---|---|---|
| 9,641,205 B1* | 5/2017 | Hyun | H04B 1/525 |
| 2004/0152531 A1 | 8/2004 | Chen | |
| 2007/0206371 A1 | 9/2007 | Yamasaki | |
| 2008/0076360 A1* | 3/2008 | Curtin | H04B 1/0067 |
| | | | 455/132 |
| 2012/0214524 A1* | 8/2012 | Wajcer | H04B 7/0845 |
| | | | 455/502 |
| 2013/0139739 A1 | 6/2013 | Naka et al. | |
| 2014/0030981 A1* | 1/2014 | Shaw | H03L 7/06 |
| | | | 455/296 |
| 2014/0126675 A1* | 5/2014 | Monsen | H04L 25/03012 |
| | | | 375/350 |
| 2014/0376416 A1* | 12/2014 | Choi | H04B 7/015 |
| | | | 370/277 |
| 2015/0252503 A1 | 9/2015 | Tokura | |
| 2016/0285486 A1* | 9/2016 | Qin | H04L 5/14 |
| 2020/0395686 A1* | 12/2020 | Jamin | H01Q 5/28 |
| 2021/0006285 A1* | 1/2021 | Kumar | H04L 5/14 |

* cited by examiner

```
# Initialize PyCUDA drivers
pycuda.driver.init()
device = pycuda.driver.Device(device_num)
context_flags = \
    (pycuda.driver.ctx_flags.SCHED_AUTO | pycuda.driver.ctx_flags.MAP_HOST)
self.context = device.make_context(context_flags)

compiled_cuda = pycuda.compiler.compiler("""
    __global__ void I_Component(float *I_M, float *Q_M, float *dest_I, const size_t num_floats, float phase) {
        const int i = threadIdx.x + (blockIdx.x * blockDim.x);
        if (i < num_floats)
            dest_I[i] = (I_M[i]*cos(phase)) - (Q_M[i]*sin(phase));
    }
""")

module = pycuda.driver.module_from_buffer(compiled_cuda)
self.kernel = module.get_function("I_Component").prepare(("P", "P", "P", "q", np.float32))
self.threads_per_block = threads_per_block

# Allocate device mapped pinned memory
self.sample_type = np.float32 self.mapped_host_malloc(vlen)
```

FIG. 8

```
# Initialize PyCUDA Drivers
pycuda.driver.init()
device = pycuda.driver.Device(device_num)
context_flags = \
    (pycuda.driver.ctx_flags.SCHED_AUTO | pycuda.driver.ctx_flags.MAP_HOST)
self.context = device.make_context(context_flags)

compiled_cuda = pycuda.compiler.compile("""
    // simple kernel that takes every input and divides by two
    __global__ void Q_Component(float *I_H, float *Q_H, float *dest_Q, const size_t num_floats, float phase) {
        const int i = threadIdx.x + (blockIdx.x * blockDim.x);
        if (i < num_floats)
            dest_Q[i] = (I_H[i]*sin(phase)) + (Q_H[i]*cos(phase));
    }
""")
module = pycuda.driver.module_from_buffer(compiled_cuda)
self.kernel = module.get_function("Q_Component").prepare(("P","P","P","q",np.float32))
self.threads_per_block = threads_per_block
# Allocate device mapped pinned memory
self.sample_type = np.float32 self.mapped_host_malloc(vlen)
```

SYSTEM, METHOD, APPARATUS, AND COMPUTER PROGRAM PRODUCT FOR PROVIDING ADAPTIVE WIRELESS NOISE CANCELLATION

CROSS-REFERENCE TO RELATED APPLICATION

This application claims the benefit of priority of U.S. provisional application No. 63/364,921, filed May 18, 2022, the contents of which are herein incorporated by reference.

BACKGROUND OF THE INVENTION

The present invention relates to wireless communications, and more particularly to noise cancellation of wireless communications signals.

Given the 5G infrastructure deployment throughout the world, RF real-estate has become ever increasingly scarce. Due to the RF band reallocation, commercial 5G carriers present a huge encroachment on SATCOM ground terminals and teleports, Radio Astronomical sites, Point-to-Point microwave systems, RADAR Altimeter systems, and a plethora of other legacy wireless systems.

Considering a non-destructive type of interference where front-end gain stages are operating well below saturation, the possibility exists of a signal-under-signal type of scenario where legacy systems operate at a reduced SNR (signal-to-noise ratio) or total loss of the (SOI) signal of interest. The above scenario will tend to be the rule and not the exception; therefore, suppression of the interfering signal can occur in the digital domain prior to any back-end receivers or modems.

As can be seen, there is a need for countermeasures to adaptively null in-band interfering emissions to mitigate 4G LTE & 5G interference in RF Bands-of-Interest where signal-under-signal anomalies have degraded the normal operations of legacy RF systems.

SUMMARY OF THE INVENTION

In one aspect of the present invention, a system for providing adaptive wireless noise cancellation to a radio frequency (RF) system is disclosed. The system includes an interference node coupled with an input of a first RF receiver. The interference node is adapted to receive a Signal-of-Interest (SOI) and an interference waveform from the RF system. A reference node is coupled with an input of a second RF receiver. The reference node is adapted to tune the input of the second RF receiver to a carrier frequency of the interfering waveform to externally collect a reference sample of the interference waveform. A control node is coupled with the first RF receiver and the second RF receiver. The control node is adapted to apply a Base-Band Vector Modulator (BBVM) to cancel the interfering waveform from the SOI.

In some embodiments, the interference node collects a raw In-Phase & Quadrature Phase (I&Q) base band component from the RF system. The I&Q base band component is collected in an intermediate frequency (IF) path of the RF system.

In some embodiments, an RF transmitter is coupled with the control node. The RF transmitter is adapted to transmit a reconstituted SOI to the IF path of the RF system. The RF transmitter may be a software defined radio (SDR) that is adapted for a Direct Digital Up Conversion (DDUC) of the reconstituted SOI to the IF path. Each of the first RF receiver and the second RF receiver are an SDR receiver.

The RF system may be a legacy RF system selected from the group consisting of a SATCOM, a RADAR, and a Point-to-Point Microwave link. The interference waveform is selected from the group consisting of a 4G LTE and a 5G wireless communications signal.

In other aspects of the invention, a method of providing adaptive wireless noise cancellation to a radio frequency (RF) system is disclosed. The method includes receiving a signal of interest (SOI) and an interference waveform from an intermediate frequency (IF) path of the RF system at a first RF receiver via an interference node. A second RF receiver is tuned to a carrier frequency of the interference waveform. A reference sample of the interference waveform is externally collected via a reference node. A Base-Band Vector Modulator (BBVM) is applied via a control node to cancel the interfering waveform from the SOI.

In some embodiments, the method further includes streaming the SOI, the interference waveform, and the reference sample to the control node via a network interface. The SOI, the interference waveform, and the reference sample are synchronized to arrive at the control node within one clock pulse.

In some embodiments, a matched filtering is applied to the reference sample. The matched filtering provides a statistical match to the interference waveform.

In some embodiments, the method includes transmitting a reconstituted SOI to the IF path of the RF system.

In some embodiments, the method includes applying a Direct Digital Up Conversion (DDUC) to the reconstituted SOI via an RF transmitter. The RF receiver and the RF transmitter may be implemented via a software defined radio (SDR).

In other aspects of the invention, an adaptive interference canceler is disclosed. The adaptive interference canceler includes a radio frequency (RF) receiver having a first input and a second input. An interference node is coupled with the first input. The interference node is adapted to receive a Signal-of-Interest (SOI) and an interference waveform from an RF system. A reference node is coupled with the second input. The reference node is adapted to tune the second input to a carrier frequency of the interfering waveform to externally collect a reference sample from the interference waveform. A control node is coupled with the RF receiver. The control node is adapted to apply a Base-Band Vector Modulator (BBVM) to cancel the interfering waveform from the SOI.

In some embodiments, the interference node is adapted to collect a raw In-Phase & Quadrature Phase (I&Q) base band component from the RF system. The I&Q base band component is collected from an intermediate frequency (IF) path of the RF system.

In some embodiments, an RF transmitter is interposed between the control node and the IF path of the RF system, the RF transmitter adapted to transmit a reconstituted SOI to the IF path of the RF system.

In some embodiments, the RF transmitter is a software defined radio (SDR) that is adapted to apply a Direct Digital Up Conversion (DDUC) to the reconstituted SOI.

These and other features, aspects and advantages of the present invention will become better understood with reference to the following drawings, description, and claims.

BRIEF DESCRIPTION OF DRAWINGS

FIG. 8 illustrates an In-Phase Channel BBVM Kernel.

FIG. 9 illustrates a Quadrature-Phase Channel BBVM Kernel.

FIG. 10 illustrates a Cross-Correlation Kernel.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention.

Broadly, embodiments of the present invention provide a system, method, apparatus, and computer program product for providing adaptive wireless noise cancellation. Aspects of the present invention provide countermeasures to adaptively null in-band interfering emissions to mitigate 4G LTE & 5G interference in RF Bands-of-Interest where signal-under-signal anomalies have degraded the normal operations of legacy RF systems.

Aspects of the invention include an Engineering Design Model (EDM) leveraging NVIDIA Graphics Processing Units (GPU) to perform parallel calculations across a 2048 Compute Unified Device Architecture (CUDA) Core architecture. This approach provides the necessary testbed to adjust the algorithms and optimize performance prior to implementation of a Field Programmable Gated Array (FPGA) implementation.

Other aspects of the invention include implementation of the Adaptive Cancellation Algorithm on silicon to adapt to real-time changes within the channel impulse response of the RF environment. This involves real-time, digital sampling of the interfering signal from the legacy wireless system against the real-time sampling of the interfering signal from an external collection antenna.

Adaptive Cancellation Algorithm

The Adaptive Cancellation Algorithm is based on a rotational CORDIC (Computer Rotational Digital Computer) implementation for navigational computations. In this application, we introduce a Base-Band Vector Modulator (BBVM), which implements a mathematical trigonometric identity as the method to rotate one or more raw In-Phase & Quadrature Phase (I & Q) base band components relative to an input phase angle θ.

The following matrix calculation provides the foundation in implementing the raw I & Q rotation.

$$\begin{bmatrix} \cos(\theta) & -\sin(\theta) \\ \sin(\theta) & \cos(\theta) \end{bmatrix} \begin{bmatrix} I \\ Q \end{bmatrix} = \begin{bmatrix} I' \\ Q' \end{bmatrix} \quad \text{Equation 1}$$

Figure 1:
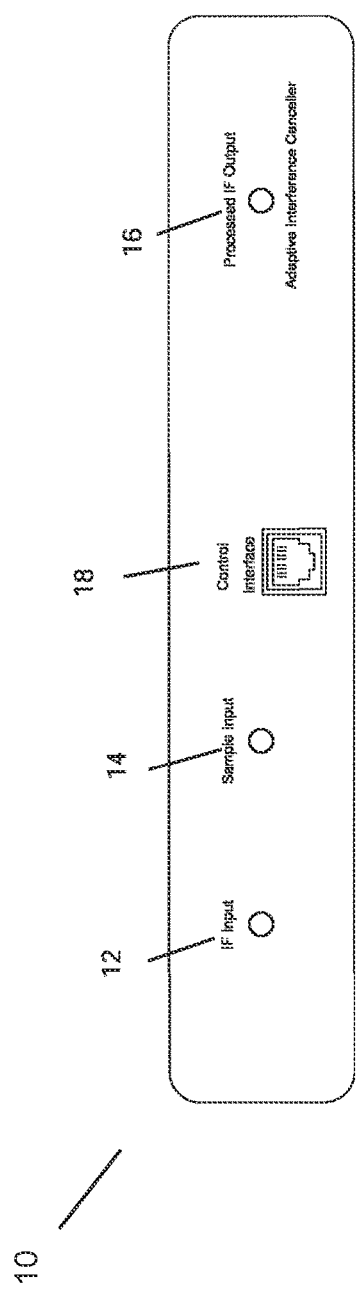
FIG. 1 is a conceptualize design for an adaptive interference cancellation device.

An Adaptability portion of the invention relies on cross-correlation methods between the in-system interference and a separate external sample of the interference. The product produces an error signal that drives the BBVM to maintain the maximum amount of suppression. In addition, allowances should be made in match filtering the external waveform sample with regards to the system interference. It is expected that multi-path nulls within the passband of the interference waveform should be applied to the external sample to maximize suppression. FIG. 1 provides a pictorial representation of the Adaptive Interference Canceler EDM (Engineering Design Model) 10 as a first article prototype.

GPU Development Platform

The GPU architecture presented in this paper provides a proving ground for real-time processing of the Base-Band Vector Modulator or BBVM. This approach allows us to spread our digital signal processing blocks across many CUDA cores for improved response times to matched filtering banks, cross-correlation, and Adaptive Suppression of the interference signal.

NVIDIA Architecture

Aspects of the invention may include a multicore processor NVIDIA Architecture as the basis of the Adaptive Interference Canceling EDM 10. In this design, we utilize a NVIDIA ORIN GPU development board representing all different function nodes within the Host CPU/Device 10 architecture. The Orin development board contains a six-core ARM Cortex-A78AE CPU 34, 8 G bytes of on-board RAM 33, and a 2048 CUDA core Ampere GPU 32. Control node 18 may include one or more network interfaces 36.

Figure 2:
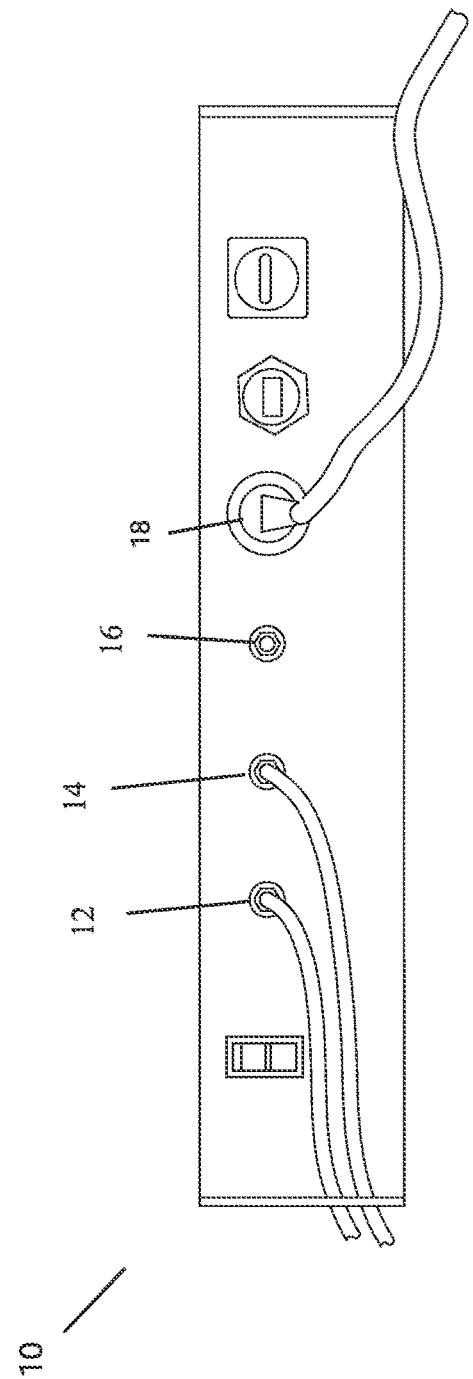
FIG. 2 is a photograph showing the adaptive interference cancellation device with software defined radios (SDRs) and Host Processor/Device GPU.

The Orin architecture is the basis of the Control Node 18 providing interfacing to the Interference Node 12, Reference Node 14, and a Recovery Node 16. As the name suggests, the Control Node 18 handles the adaptive tasking and BBVM cancellation processing with regards to the other three nodes. FIG. 2 shows an alternative embodiment of the Adaptive Interference Cancellation system 10 according to aspects of the invention.

Referencing FIG. 2, the Top Layer from left to right, shows the signal interface of the Interference Node 12, the Reference Node 14, and the Recovery Node 16, which may be connected via a Subminiature version A (SMA) connector. The bottom layer of the Adaptive Interference Cancellation EDM 10 contains two Software Defined Radios 20 & 22, representing the Interference node 12, Reference node 14, and Recovery nodes 16, respectively.

The Interference Node 12 collects raw 16-bit (I & Q) samples from the Intermediate Frequency or I.F. path of legacy RF systems plagued with 4G LTE/5G interference. This process may be achieved through the combination of a single Host Processor 10 and NVIDIA GPU Single Board Computer and a single Software Defined Radio (SDR) 20 with two separate receiver inputs. A dual receiver input SDR 20 allows for synchronization of the I & Q samples to arrive to the Host processor 10 within one clock pulse. Concisely, the Interference Node 12 receives samples of both the Signals-of-Interest (SOI) and the encroaching 4G LTE/5G Interference Waveform; whereas the Reference Node 14 only samples the Interference Waveform.

The Interference Node 12 streams the collected samples to the Control Node 18 through a network port assignment. By way of non-limiting example, a static IP address may be assigned to the Interference Node 12 to stream data to the Control Node 18 on port 5000; whereas command and control from the Control Node 18 may utilize port 5001.

To subtract the interfering waveform, a replica or a close estimate of the interference signal may be utilized. Much like the Interference Node 12, the Reference Node 14 contains the same hardware configuration but preferably utilizes a different port assignment, such as 5002.

In this case, the Reference Node 14 tunes its SDR 20 to the carrier frequency of the interfering signal to externally collect reference samples from the 4G LTE/5G interference. A matched filtering may be applied to the sampled waveform that provides a statistical match to its interfering counterpart. The Reference Node 14 streams the processed samples to the Control Node 18 for maximum interference waveform suppression.

The RF SMA Port 16 to the far right in FIG. 2 represents the Recovery Node 16, which provides a reconstituted signal-of-interest (SOI) following a Digital Direct Up Conversion (DDUC) to the I.F. path. Digital Direct Up Conversion refers to the process in the Recovery Node 16. The SDR 22 used with the Recovery Node 16 relies on the DDUC to translate the reconstituted signal-of-interest and up convert that waveform to the correct Intermediate Frequency. Thus, the Recovery Node 16 relies on RF transmitter 22 of the SDR to translate or 'Up Convert' the baseband recovered SOI to the appropriate intermediate frequency to match input requirements of the legacy system's intermediate frequency.

Figure 3:
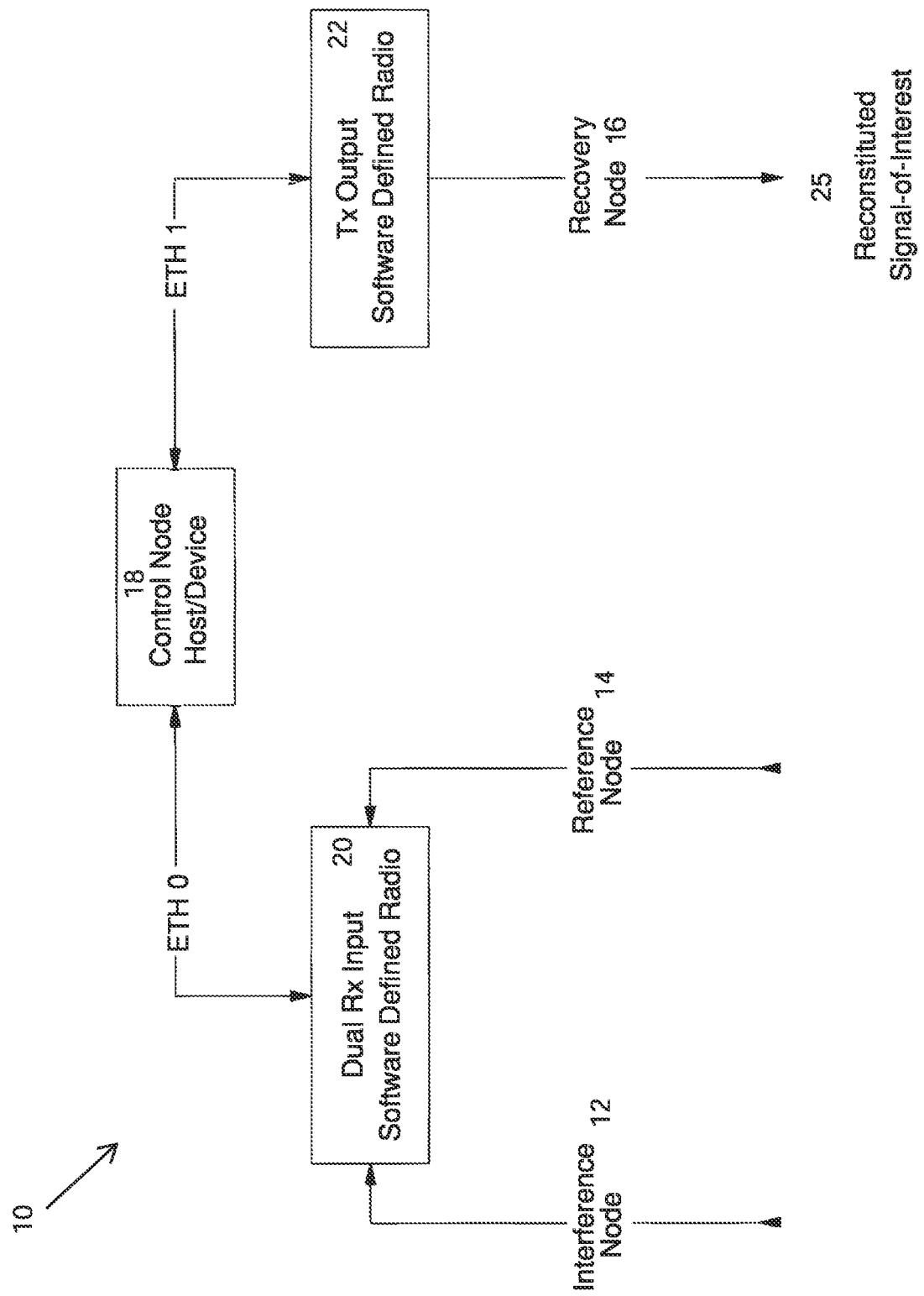
FIG. 3 is a block diagram of the adaptive interference cancellation system and interfaces.

As demonstrated in FIG. 3, the Adaptive Interference Cancellation EDM 10 is coupled with the IF chain of the legacy RF system between the Interference Node 12 and the Recovery Node 16. The reference node 14 collects the Interference Waveform separately.

CUDA Core Tasking

Base-Band Vector Modulator (BBVM)

This section focuses primarily on the Graphics Processing Unit (GPU) and the coding efforts to leverage the fast-parallel processing CUDA architecture from NVIDIA. A Compute Unified Device Architecture (CUDA) relies on a parallel processing of the Base-band Vector Modulator (BBVM) to produce a real-time computation of the I & Q rotation vectors. Therefore, it is the intention of this section to highlight the evolutionary steps taken to implement the BBVM and Cross Correlator functions onto a 2024 CUDA Core Ampere GPU.

The software development environment may be implemented in a Python 3.10 Programming Framework. The Python 3.10 programming framework along with the PyCUDA libraries provide an optimum software interface to embed the CUDA C++ language within the BBVM Kernel.

Residing on the Control Node 18, as shown in FIG. 4a-4d, the BBVM exists as two separate digital signal processing (DSP) blocks implementing a phase rotation of In-Phase components independent of Quadrature Phase components in the separate DSP blocks. Nevertheless, both I & Q DSP Blocks remain synchronized, receiving the same real-time tasking of the phase component, number of processing blocks, and number of parallel threads per block. As shown in FIGS. 8 and 9, both I & Q embedded kernels work in parallel to create the waveform suppression function of the BBVM. On the activation of the BBVM DSP Blocks, both CUDA C++ Kernels are compiled as real-time functions operating on the NVIDIA Ampere GPU.

Arguments and streaming data are passed to and from the BBVM Kernel through a Shared Memory 33. Efficiencies are achieved with the utilization of the Shared Memory 33 between the host CPU host processors 34 and the Device (GPU) 36. This provides the environment of Mapped Pinned memory 34 between the Host and the Device reducing latencies during data transfers. The SDRs 20, 22 may be connected via a USB port 35.

Figure 4A:
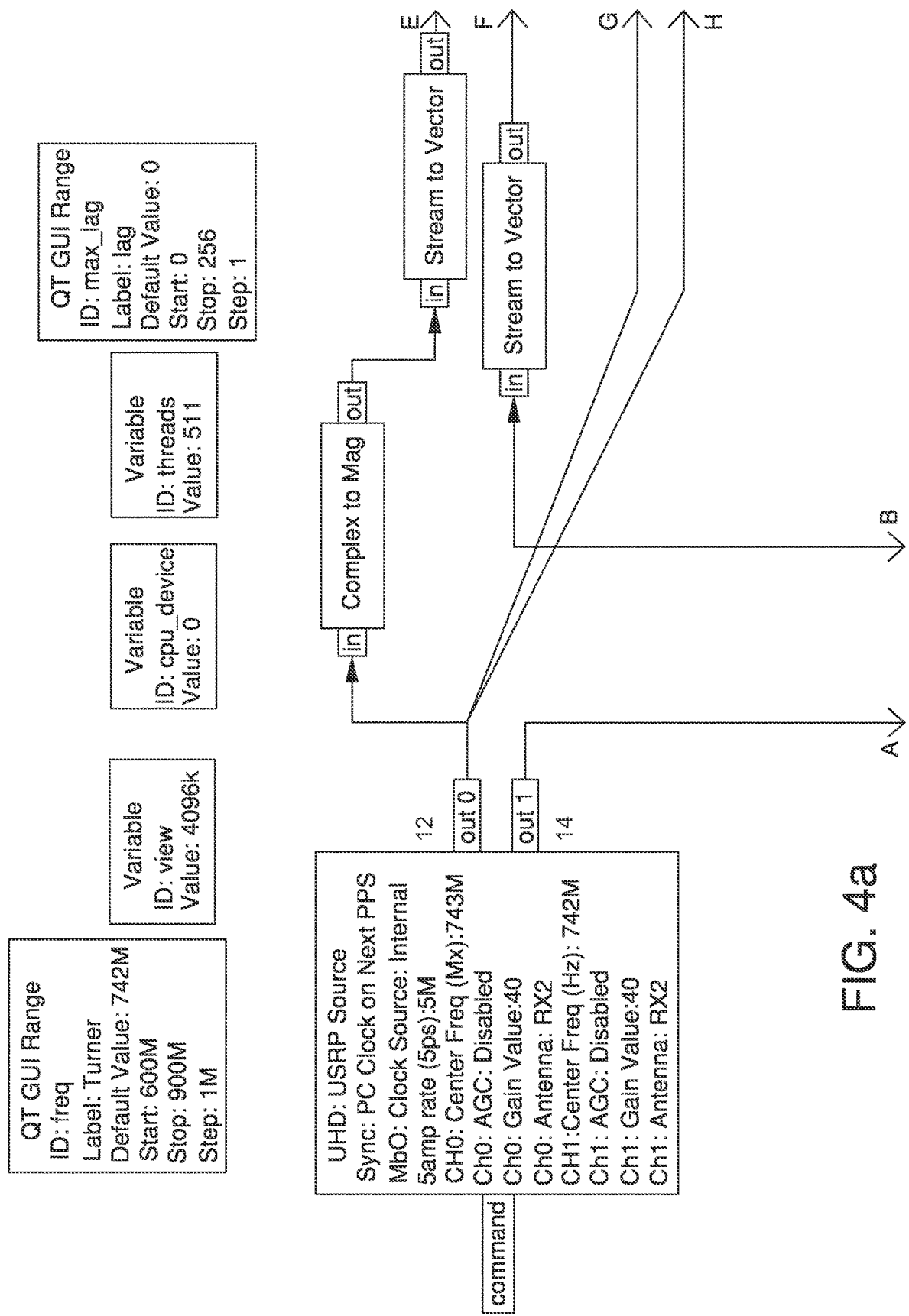
FIGS. 4A through 4D illustrate a process flow diagram illustrating a Base-Band Vector Modulator (BBVM) and Cross-Correlation GPU Processing Blocks and Signal Flow.
Figure 4B:
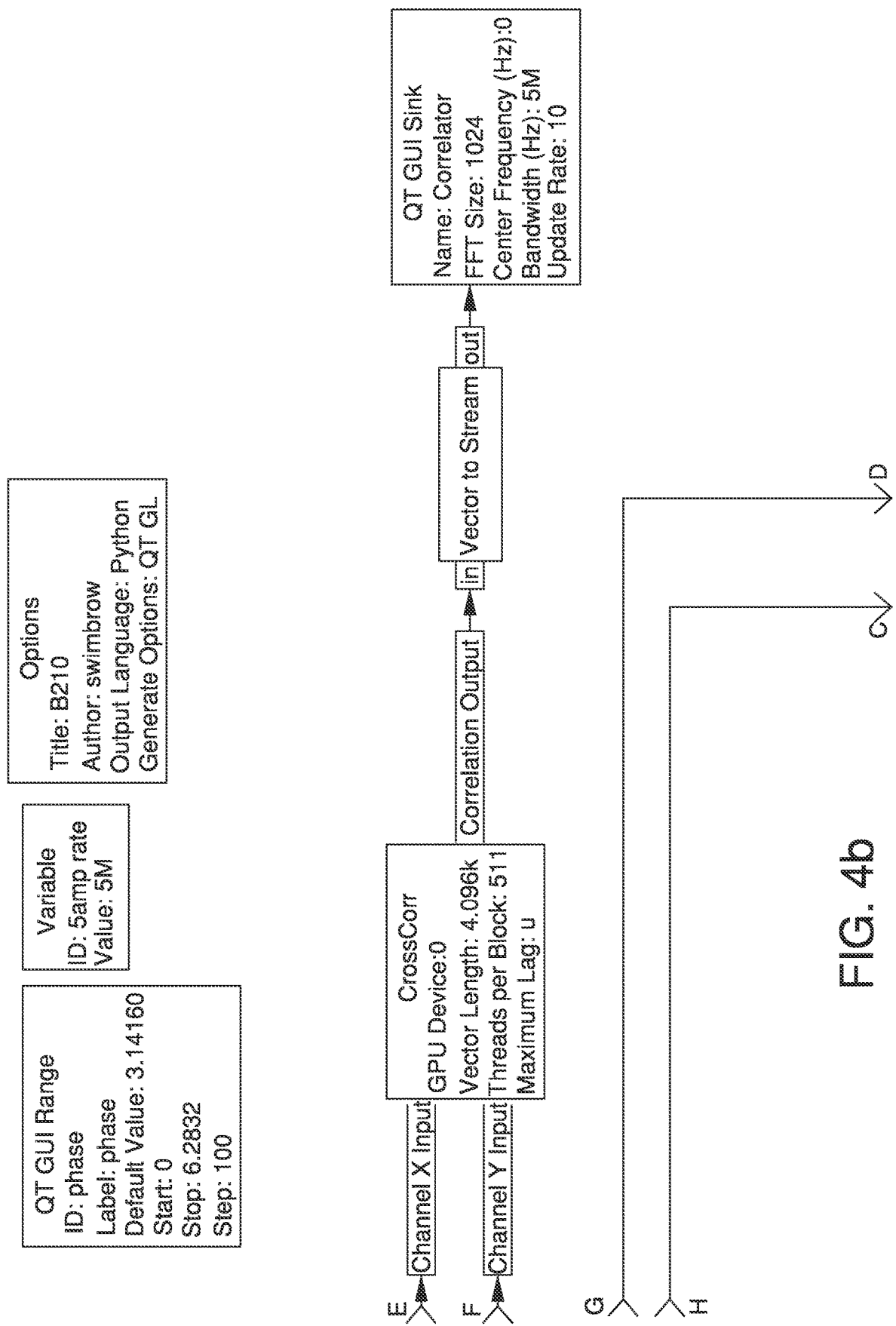
Figure 4C:
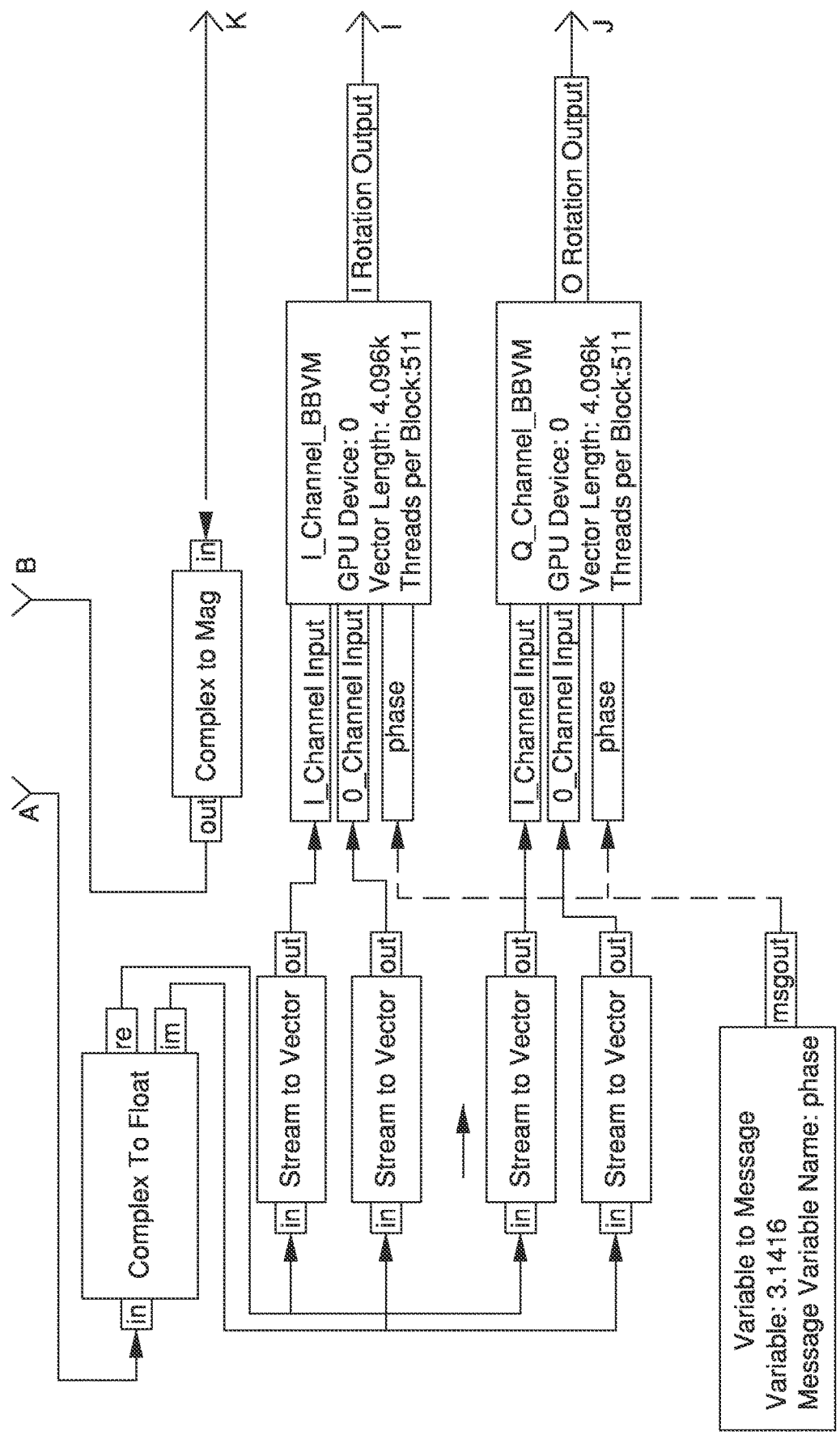
Figure 4D:
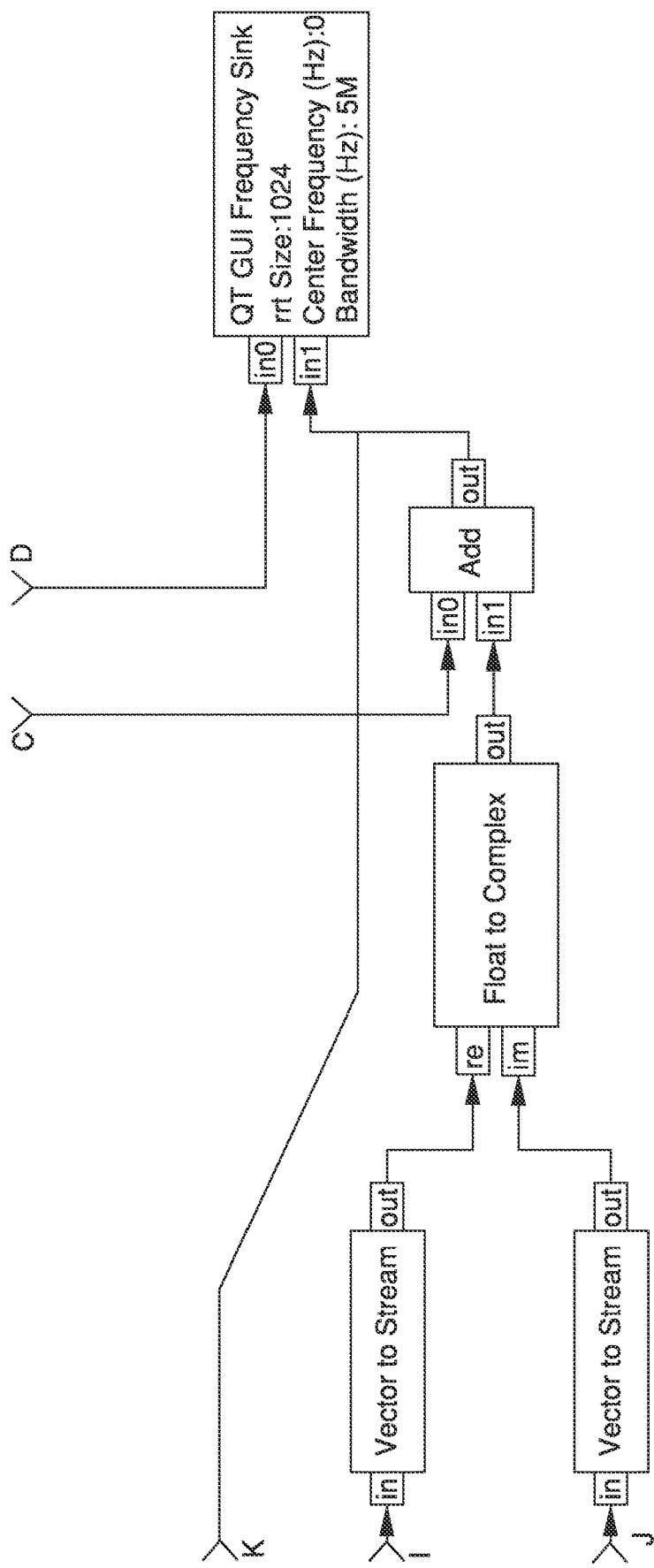
Figure 4E:
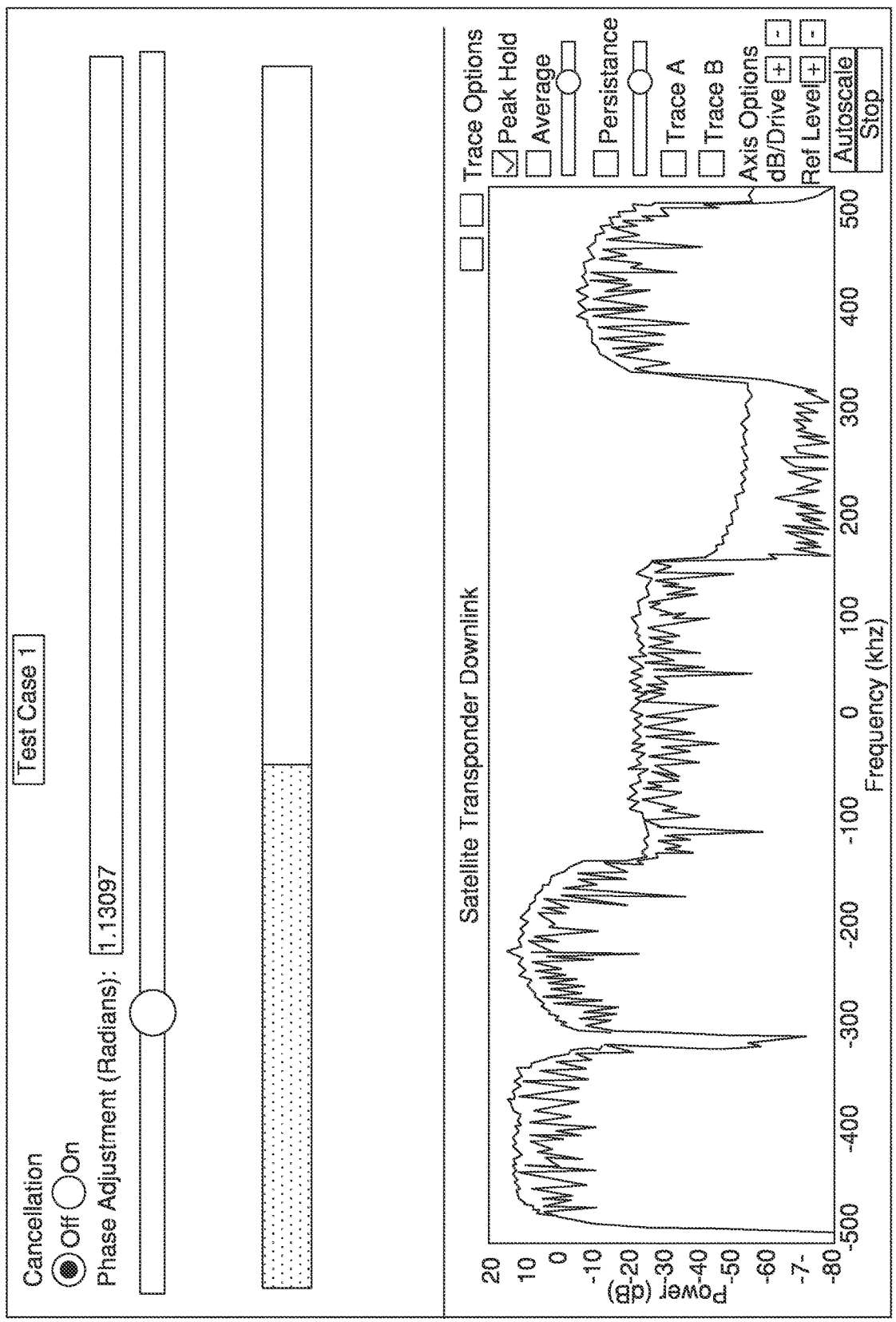
FIG. 4e illustrates a first test case showing the BBVM without waveform suppression from the test bench provided in FIGS. 4a-4d.
Figure 4F:
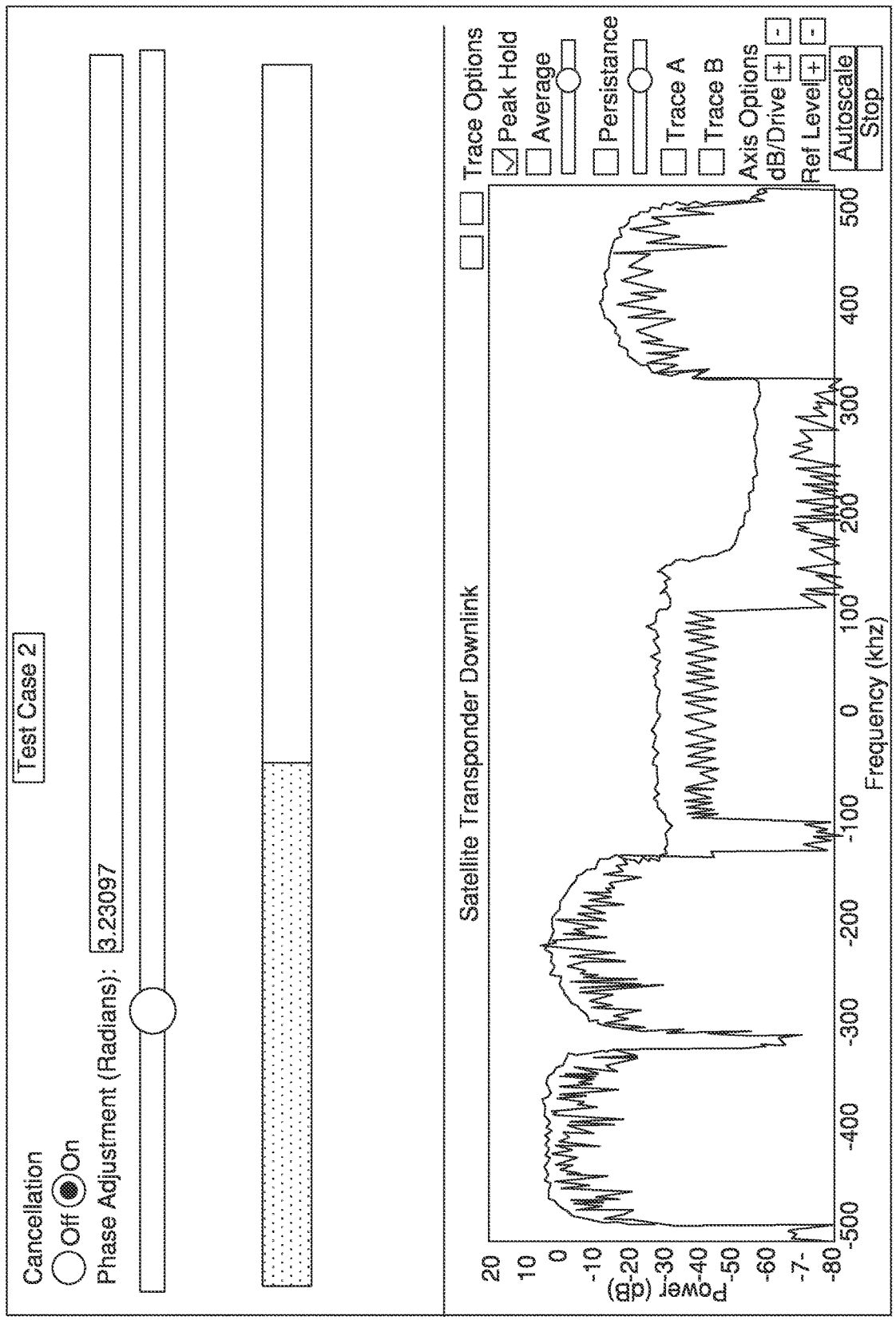
FIG. 4F illustrates a second test showing the BBVM with waveform suppression from the test bench provided in FIGS. 4a-4d.

A Test Bench design provides the BBVM(s) ability to suppress waveforms through the control loop for the phase adjustment. FIGS. 4e and 4f demonstrate GPU loading and waveform suppression from the Test Bench provided, with FIG. 4e showing the cancellation off and FIG. 4f showing the cancellation active. In these examples, the phase angles are manually entered into a Slider Control verifying phase data floating point abstraction from the Message Dictionary. The phase data floating point values are assigned to an internal variable to be passed to the GPU Kernel to process the rotation of the I & Q Vector.

GPU Based Cross Correlator

A Cross Correlation DSP Block resides on the Control Node 18 of the Adaptive Cancellation System 10. The Correlation Kernel exists as an embedded compiled code within the Cross-Correlation DSP Block as shown in FIGS. 4a-4d. Like the BBVM DSP Blocks, the Cross-Correlation Kernel is compiled as a real-time processing function resident on the NVIDIA Ampere GPU. This Cross-Correlation Kernel, referenced in FIG. 10, allows high-speed computationally intensive mathematical operations shared among the GPU cores 32 providing the cross product of interference waveforms post BBVM processing.

The central function of the Cross-Correlator Block is to provide an error signal between the Interference Node 12 waveform and the Recovery Node 16 waveform. Correlation peaks during phase equivalency between the two waveforms provides a metric in which to steer or rotate the phase of the Interference 7-radians from the Reference creating waveform suppression.

The Cross-Correlation kernel receives a dual channel of floating-point arrays representing both the Interference & Recovery waveforms as inputs to Channel X & Channel Y of the correlation kernel. Since both floating-point arrays are discrete values of data, a sigma notation of the correlation calculation produces the desired results.

Equation 2 provides the mathematical definition of the cross-correlation properties where two separate discrete functions are multiplied together with a delay factor of k. However, the algorithm represented in the CUDA kernel calculates the Dot-Product of the two waveform sequences storing the results in a floating-point variable. The correlated results are the function of the Dot-Product divided by the number of samples within the array.

$$R_{xy} = \sum_{n=0}^{N-1} x(n)y(n-k) \qquad \text{Equation 2}$$

Field Programmable Gated Array (FPGA) Embodiment

Following a similar topology as the GPU Development Platform, the FPGA embodiment may also rely on a 3-node architecture using Analog Devices' Receiver/Transceiver chipsets.

In this embodiment, the digital signal processing, interface, and control reside on the FPGA as a hardware alternative to the GPU embodiment. It is to be noted, unlike Digital Signal Processing implemented on a GPU, an FPGA is a hardware implementation capable of only fixed-point operations.

IF Sampling

Figure 5:
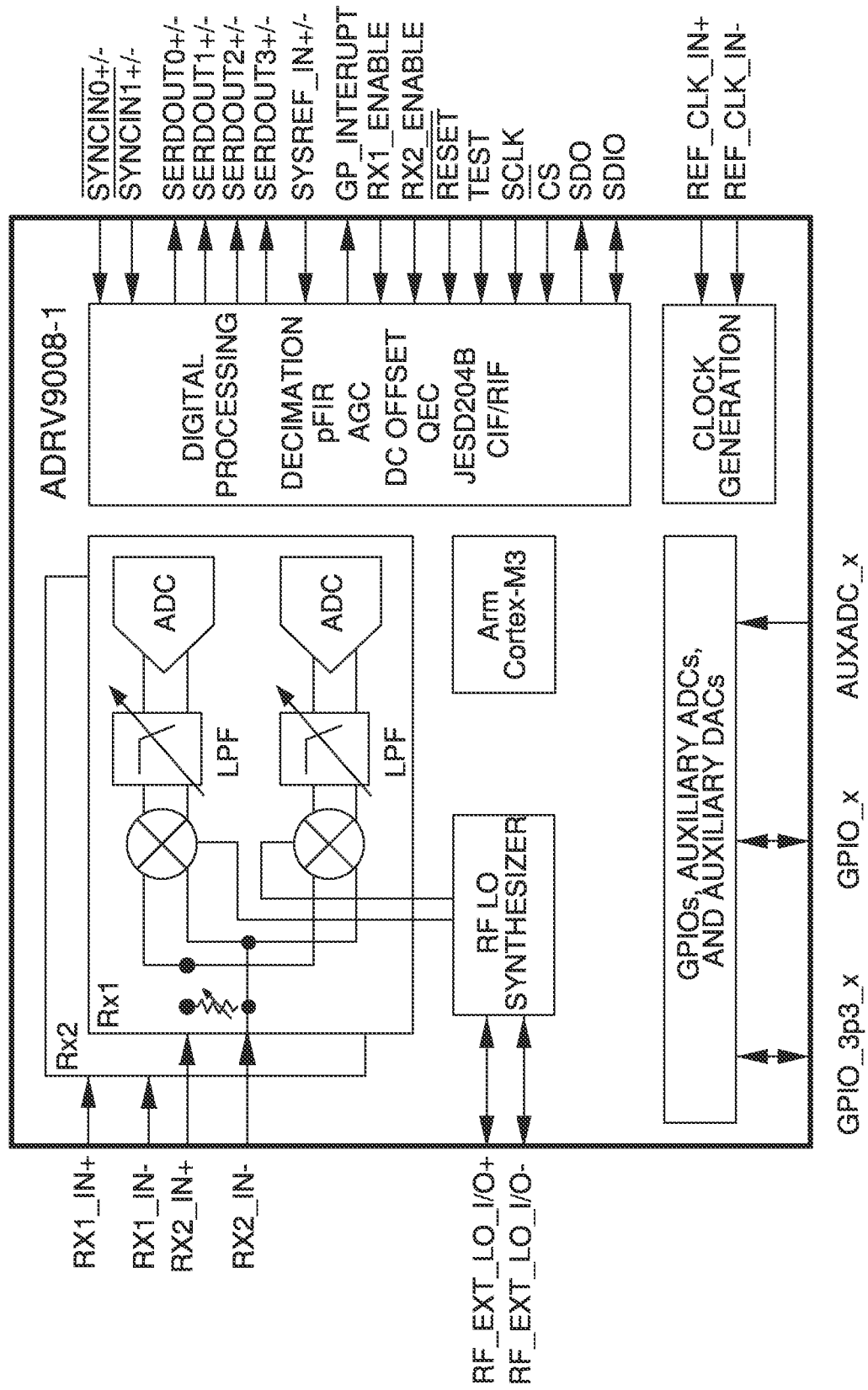
FIG. 5 is a schematic diagram of an ADRV9008 Dual Receiver ASIC manufactured by Analog Devices, Norwood, MA.

The IF sampling may rely on an ADRV9008-1 integrated dual RF receiver ASIC (Application Specific Integrated Circuit) from Analog Devices, such as shown in FIG. 5. The ADRV9008-1 architecture provides a maximum instantaneous bandwidth of 200 MHz with a tuning range from 75 MHz to 6 GHz. Since the device supports 3G/4G/5G FDD protocols, it fits nicely in support of the proposed Adaptive Interference Canceling method. Another feature of this approach is the utilization of the JEDEC JESD204B serial interface providing data transfer speeds up to 12.288 Gbps.

After processing and the removal of the in-band interferer, the reconstituted Signals of Interest (SOI) 25 are reinserted back into the compromised communications system for continued operations before the modem. The reconstitution of those signals relies on an RF transmitter 22, such as the transmitter section of an SDR, such as an Analog Devices ADRV9009 transceiver architecture.

Figure 6:
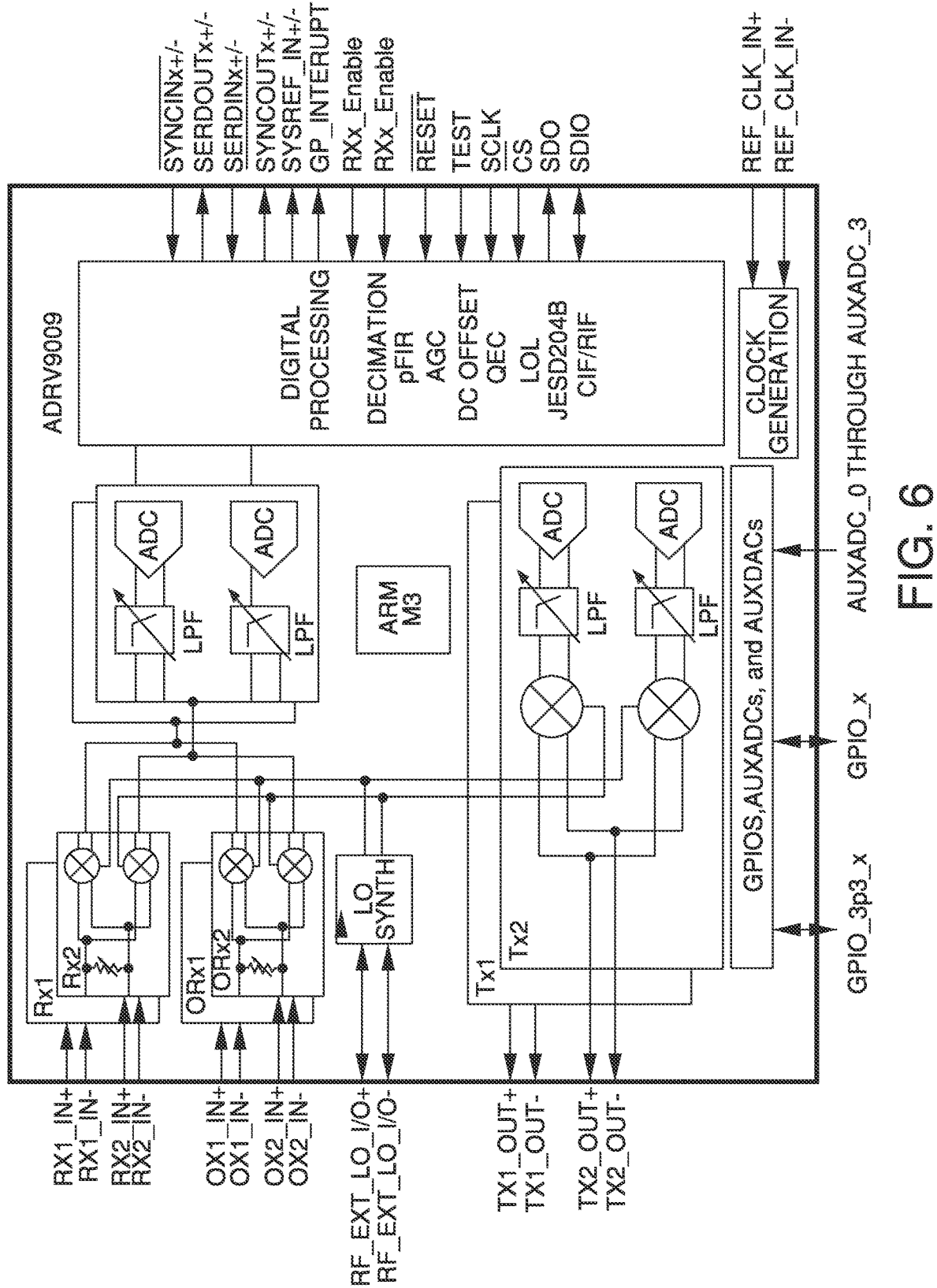
FIG. 6 is a schematic diagram of an ADRV9009 Transceiver ASIC manufactured by Analog Devices, Norwood, MA.
Figure 7:
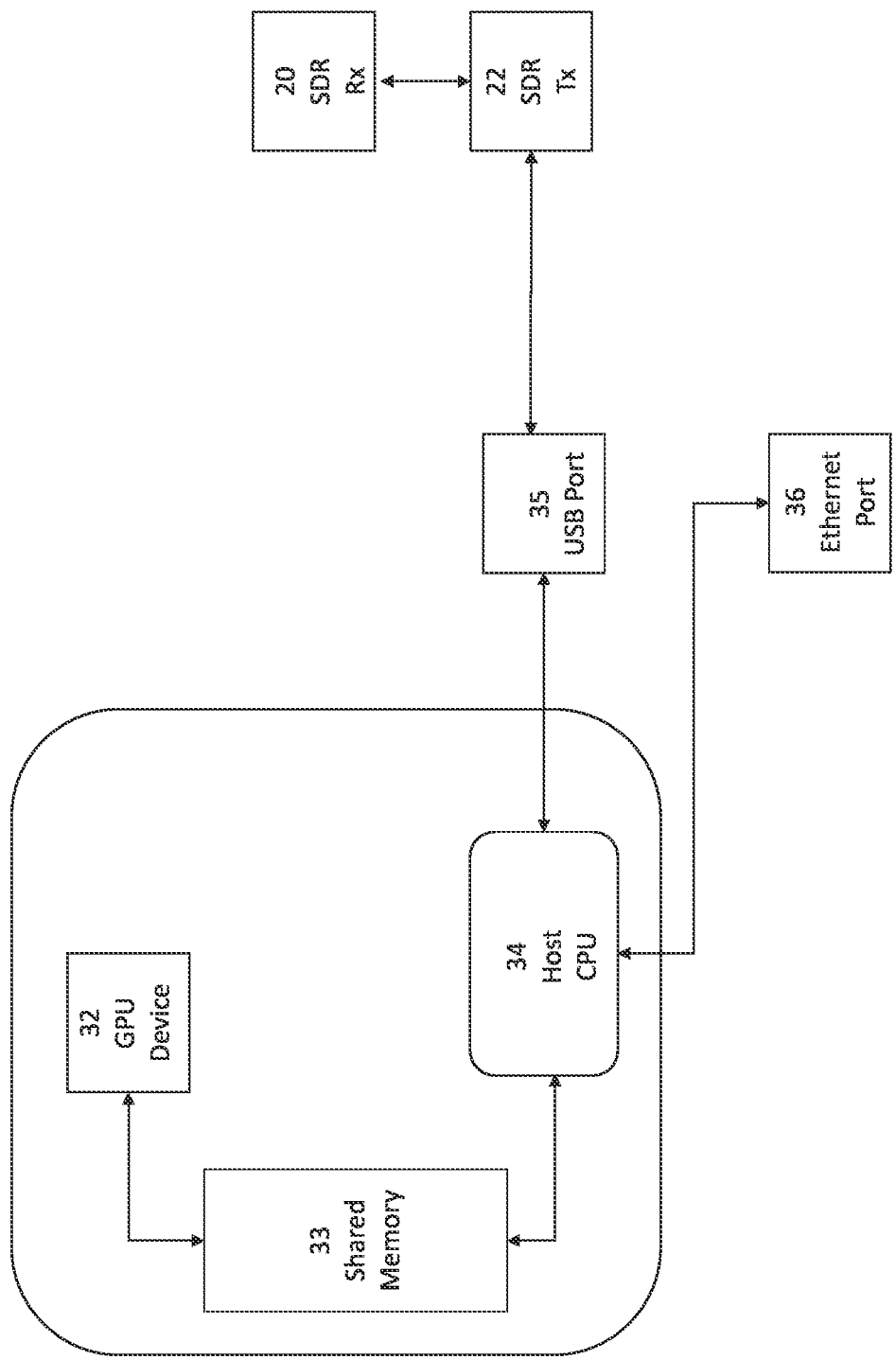
FIG. 7 is a top plan view of the representative hardware configuration of the adaptive interference cancellation system.

The Transceiver ASIC, as shown in FIG. 6, shares similar specifications and features as its counterpart the ADRV9008. This includes 3G/4G/5G FDD protocols, maximum 200 MHz instantaneous bandwidth, 75 MHz to 6 GHz tuning range, and the JEDEC JESD204B serial interface.

FPGA and Back-End Design

Control of the ADRV9009 transceiver and further signal processing may be performed using a field programmable gate array (FPGA). This embodiment utilizes a readily available FPGA development board to reduce program schedule and risk, as well as serve as the glue logic between both ASIC based radios and the Host processing board. This embodiment includes an interface, Input Signal Processing resolution, hardware, FPGA Application, Software Application, and system packaging.

Interface

Leveraging the ADRV9008 & ADRV9009 to provide raw I&Q data to and from the FPGA, this embodiment is capable of adherence to the Joint Electron Device Engineering Council (JEDEC) JESD204B specifications for high-speed serial interface.

Analog Devices consolidates the JESD204B interface into three layers. The receiver implementation using the ADRV9008 collects process samples into a Transport Layer applying sample & frame construction. A Link Layer applies bit scrambling, Frame Alignment, and Character Generation. Finally, an 8B/10B encoder is applied prior to a Physical Layer. The final layer, the Physical Layer, performs serialization of the data.

Resolution of Input & Output Signal Processing

An Analog-to-Digital Converter (ADC) for each receiver channel provides 16 bits of resolution, equating to 98 dB of dynamic range, allowing for higher sensitivity with larger boundaries to capture and process weak Signals-of-Interest (SOI) without distortions from encroaching interferers. Likewise, the Digital-to-Analog converter (DAC) on the transmitter side provides 14 bits of resolution. This provides adequate reconstitution of the recovered SOI from the interference.

Target Hardware Development

To accommodate the maximum instantaneous bandwidth of 200 MHz of the ADRV9008 Dual Channel Receiver, the FPGA clock should support a minimum Nyquist speed of 400 MHz. In addition, the FPGA should conform to the JESD204B serialization standard.

Hardware Descriptive Language Development

The system relies on a custom Verilog code residing in the FPGA for development of the BBVM (Baseband Vector Modulator) module designed to rotate raw In-phase and Quadra-phase channels around a Cartesian plane. In addition, the bulk of the baseband processing will also reside in the FPGA and/or development board platform. This ensures that all time sensitive algorithms are performed at hardware speed.

Software Application

A software platform is utilized for additional processing, command & control, cataloging, and the display of data such as waveform artifacts. Ideally, FPGA embedded processors would be used to perform most of these tasks. However, the code development environment(s) available for these processors may introduce unnecessary complexities to the software development cycle and are not best suited to rapid prototype development.

By way of non-limiting example, the Python 3 framework provides a simple interface between the FPGA development board and a laptop computer. Since most of the heavy lifting is done in the FPGA, the bandwidth requirements of this interface are reduced. Leveraging the many mature open-source libraries available for signal processing and data display, Python 3 is an excellent choice to speed up the software development cycle.

Packaging

The EDM (Engineering Design Model) of this embodiment should conform to a cohesive deployable prototype designed for rack mount applications. This includes a secure packaging of wide-band agile RFIC (Radio Frequency Integrated Circuit) modules, FPGA Development Board, Low Noise DC Supply Regulation to reduce amplitude noise modulation of the front-end gain stage, and user-friendly interface connections and controls. The EDM contains all the necessary hardware and software components to be implemented in a more compact, power-saving, and cost-effective solution.

The EDM is intended to address the challenge of operating legacy systems in an overcrowded spectrum. Given the commercial push for higher data rates for our wireless devices, 5G OFDM carriers are occupying more of the spectrum. Consequently, legacy wireless systems including SATCOM, RADAR, and Point-to-Point Microwave links experience an in-band signal-under-signal type of an encroachment leading to total loss of lock and acquisition of assets. Considering a non-destructive interference, the EDM employs a baseband technique to remove and nullify the commercial wireless intruder while preserving signals-of-interest.

The evolution to a GPU based solution provides a proving ground for the adaptive algorithms while maintaining a proof-of-concept approach prior to an FPGA final solution. Therefore, development time and risk can be reduced with the integration of Custom Off-The-Shelf (COTS) hardware and open-source tools.

The end-goal in this effort is to fabricate and produce an FPGA turnkey solution that can fit multiple RF encroachment scenarios. Therefore, Aspects of the invention provide an on-the-fly hardware configurable solution.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A system for providing adaptive wireless noise cancellation to a radio frequency (RF) system, comprising:
   an interference node coupled with an input of a first RF receiver, the interference node adapted to receive a Signal-of-Interest (SOI) and an interference waveform from the RF system;
   a reference node coupled with an input of a second RF receiver, the reference node adapted to tune the input of the second RF receiver to a carrier frequency of the interference waveform to externally collect a reference sample from the interference waveform; and
   a control node coupled with the first RF receiver and the second RF receiver, the control node adapted to apply a Base-Band Vector Modulator (BBVM) to cancel the interference waveform from the SOI.

2. The system of claim 1, wherein the interference node collects a raw In-Phase & Quadrature Phase (I&Q) base band component from the RF system.

3. The system of claim 2, wherein the I&Q base band component is collected in an intermediate frequency (IF) path of the RF system.

4. The system of claim 1, further comprising:
   an RF transmitter coupled with the control node, the RF transmitter adapted to transmit a reconstituted SOI to an intermediate frequency (IF) path of the RF system.

5. The system of claim 4, the RF transmitter comprising:
   a software defined radio (SDR), adapted for a Direct Digital Up Conversion (DDUC) of the reconstituted SOI to the IF path.

6. The system of claim 1, wherein the RF system is a legacy RF system selected from the group consisting of a SATCOM, a RADAR, and a Point-to-Point Microwave link.

7. The system of claim 1, wherein the interference waveform is selected from the group consisting of a 4G LTE and a 5G wireless communications signal.

8. The system of claim 1, wherein each of the first RF receiver and the second RF receiver are a software defined radio (SDR) receiver.

9. A method of providing adaptive wireless noise cancellation to a radio frequency (RF) system, comprising:
   receiving a signal of interest (SOI) and an interference waveform from an intermediate frequency (IF) path of the RF system at a first RF receiver via an interference node;
   tuning a second RF receiver to a carrier frequency of an interference waveform;
   externally collecting a reference sample of the interference waveform via a reference node; and
   applying a Base-Band Vector Modulator (BBVM) via a control node to cancel the interference waveform from the SOI.

10. The method of claim 9, further comprising:
    streaming the SOI, the interference waveform, and the reference sample to the control node via a network interface; and
    synchronizing SOI, the interference waveform, and the reference sample to arrive at the control node within one clock pulse.

11. The method of claim 9, further comprising:
    applying a matched filtering to the reference sample, the matched filtering providing a statistical match to the interference waveform.

12. The method of claim 10, further comprising:
    transmitting a reconstituted SOI to the IF path of the RF system.

13. The method of claim 12, further comprising:
    applying a Direct Digital Up Conversion (DDUC) to the reconstituted SOI via an RF transmitter.

14. The method of claim 13, wherein the RF receiver and the RF transmitter are a software defined radio (SDR).

15. An adaptive interference canceler, comprising:
    a radio frequency (RF) receiver having a first input and a second input;
    an interference node coupled with the first input, the interference node adapted to receive a Signal-of-Interest (SOI) and an interference waveform from an RF system;
    a reference node coupled with the second input, the reference node adapted to tune the second input to a carrier frequency of the interference waveform to externally collect a reference sample from the interference waveform; and
    a control node coupled with the RF receiver, the control node adapted to apply a Base-Band Vector Modulator (BBVM) to cancel the interference waveform from the SOI.

16. The adaptive interference canceler of claim 15, wherein the interference node is adapted to collect a raw In-Phase & Quadrature Phase (I&Q) base band component from the RF system.

17. The adaptive interference canceler of claim 16, wherein the I&Q base band component is collected from an intermediate frequency (IF) path of the RF system.

18. The adaptive interference canceler of claim 15, further comprising:
   an RF transmitter interposed between the control node and an intermediate frequency (IF) path of the RF system, the RF transmitter adapted to transmit a reconstituted SOI to the IF path of the RF system.

19. The adaptive interference canceler of claim 18, the RF transmitter comprising:
   a software defined radio (SDR) adapted to apply a Direct Digital Up Conversion (DDUC) to the reconstituted SOI.

\* \* \* \* \*